United States Patent

[11] 3,598,431

| [72] | Inventor | Joseph Giambalvo<br>1118 Willoughby Ave., Brooklyn, N.Y. 11237 |
|---|---|---|
| [21] | Appl. No. | 37,270 |
| [22] | Filed | May 14, 1970<br>Division of Ser. No. 790,293, Jan. 10, 1969, Pat. No. 3,545,387, which is a continuation-in-part of Ser. No. 656,939, July 28, 1967, Pat. No. 3,437,060. |
| [45] | Patented | Aug. 10, 1971 |

[54] ADJUSTABLE WEDGE CONSTRUCTION
5 Claims, 9 Drawing Figs.

[52] U.S. Cl. ................................................. 287/20.3, 108/151
[51] Int. Cl. .................................................. F16b 12/20
[50] Field of Search ........................................ 287/20.92G 20.3, 52.08, 124; 248/413, 412, 239, 157; 108/151; 269/48.1; 279/87, 77; 306/34

[56] References Cited

UNITED STATES PATENTS

| 1,264,230 | 4/1918 | Vierus ........................ | 287/52.08 |
| 2,805,866 | 9/1957 | Amend ....................... | 287/20.3 X |
| 3,489,392 | 1/1970 | Thom ......................... | 287/124 |

FOREIGN PATENTS

| 993,059 | 7/1951 | France ........................ | 269/48.1 |

Primary Examiner—David J. Williamowsky
Assistant Examiner—Andrew V. Kundrat
Attorney—Browdy and Neimark ABSTRACT: An adjustable wedge for use in adjustable furniture construction made up of two halves adapted to pivotally fit together to form a rectangular shape, and an adjusting screw adapted to be turned to cause relative rotation between the halves to form a wedge.

PATENTED AUG 10 1971
3,598,431
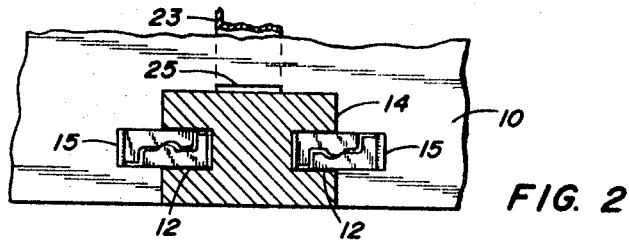
FIG. 2
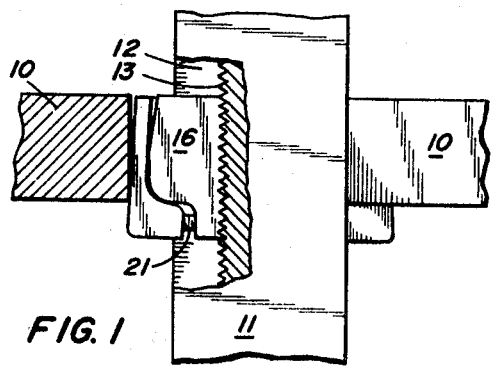
FIG. 1
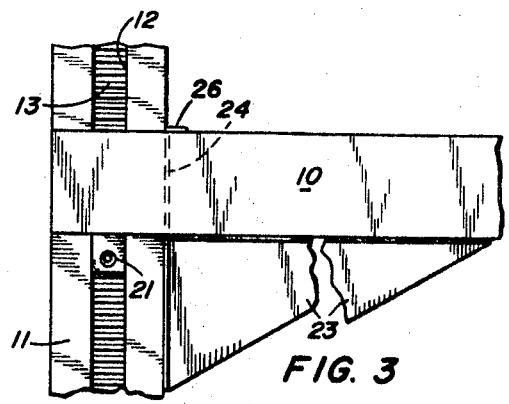
FIG. 3
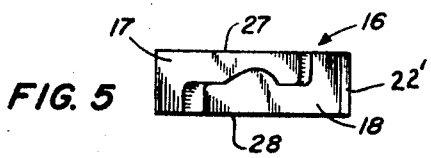
FIG. 5
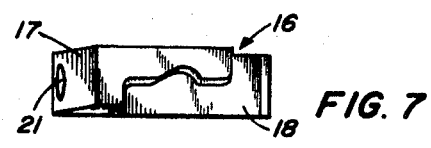
FIG. 7
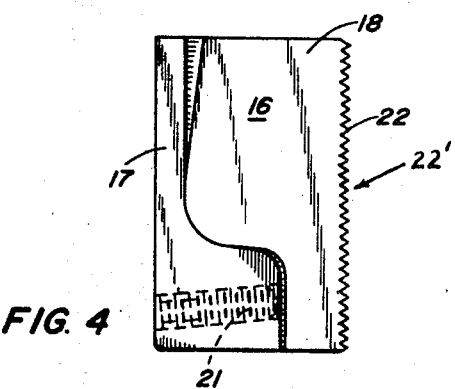
FIG. 4
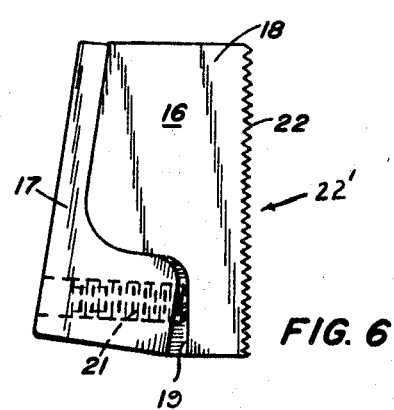
FIG. 6
FIG. 8
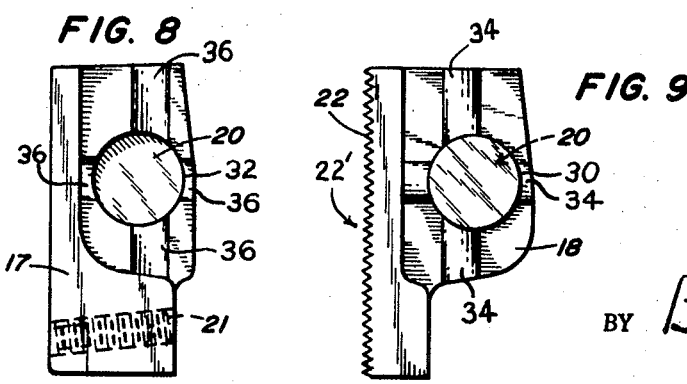
FIG. 9
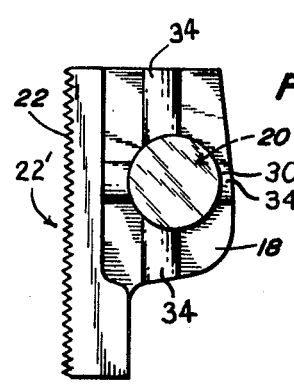
INVENTOR
JOSEPH GIAMBALVO
BY Browdy and Neimark
ATTORNEYS

ADJUSTABLE WEDGE CONSTRUCTION

This application is a division of application Ser. No. 790,293 filed Jan. 10, 1969 and now U.S. Pat. No. 3,545,387 which is a continuation-in-part of application Ser. No. 656,939 filed July 28, 1967 and now U.S. Pat. No. 3,437,060 by the same inventor.

The present invention relates to an adjustable wedge for use in modular furniture and more particularly to a wedge of improved construction which will enable expedient, convenient and accurate assembly thereof with the modular furniture.

The aspect of having furniture adjustable is a most desirable one, but means for accomplishing this end have been most unsatisfactory in the prior art and have necessitated the use of fastening means such as nails, screws, glue, pegs or dowels, or the use of special tools. These methods of construction did not permit economical manufacture of attractive and high quality furniture of modern style. The prior art had the further disadvantage of not permitting construction of furniture which could be easily stored and shipped in knockdown condition and which could be quickly and easily reassembled into sturdy and attractive pieces.

The present invention offers considerable improvement over the prior art devices by effectively overcoming their many disadvantages in that it provides a new and unique means wherewith the various horizontal and vertical components of furniture may be readily separated and reassembled without the use of complicated fastening devices or the use of special tools.

Furniture which can be readily assembled and disassembled in the manner possible using the wedge construction of the present invention is of great utility, particularly for people who frequently move from place to place, such as armed forces personnel, and also for people who live in mobile homes and other places where space is at a premium.

Further, the novel adjustable wedge described herein can be used not only in the adjustable furniture construction described but can also be used wherever an adjustable wedge is desirable.

Thus, an object of the invention is the provision of an adjustable furniture construction which includes gripping means adapted to afford accurate positioning of the structural components and to afford positive connection therebetween.

Still another object of the invention is to provide a novel adjustable wedge structure which may be readily adjusted to increase and decrease its wedging action.

Still another object of the present invention is the provision of a device of the foregoing character which will be simple in structure, economical of manufacture, easily and quickly assembled, aesthetic in appearance, and highly effective in use.

Other objects, advantages and novel features of the invention will become apparent from the following detailed description of the invention when considered in conjunction with the accompanying drawings wherein:

FIG. 1 shows an elevation view, partly in section, of the wedge expanded to hold horizontal and vertical members together;

FIG. 2 is a plan view showing wedges on either side of the vertical member;

FIG. 3 shows a side view of the invention;

FIG. 4 shows an elevation view of the wedge alone, in an unexpanded position;

FIG. 5 is a plan view of the unexpanded wedge;

FIG. 6 is an elevation view of the wedge expanded;

FIG. 7 is a plan view of the wedge expanded;

FIGS. 8 and 9 show the two halves of the wedge.

Referring now to the drawings there is shown in FIG. 1 a horizontal member 10 which may be any portion of furniture that is to be rigidly joined to another piece of furniture. In this case, for example, it may be a horizontal shelf as in a bookcase on cabinet that is to be joined to a vertical member 11. Vertical member 11 has a channel 12 cut into each of its narrow sides and extending along its full length, the bottom, or innermost face of channels 12 may be serrated to form a row of ridges 13, the use of which will be more fully explained hereinafter.

As can be better seen in FIG. 2, horizontal member 10 has a cutout portion 14 which is the same dimensions as vertical member 11 so that vertical member 11 will slidingly fit into the cutout 14 and still leave a smooth unbroken surface at the outer edge of the member 10. Also formed into each narrow side of cutout 14 there is a groove 15, and from a perusal of FIG. 2 it will be obvious that grooves 15 exactly mate with the channels 12 in vertical member 11.

In order to rigidly secure horizontal member 10, at any desired height, to vertical member 11, there is utilized an expandable wedge 16, shown in detail in FIGS. 4 through 9, to lodge the two parts together. Wedge 16 consists of two halves 17 and 18 which are designed to move about a pivot 20 when the halves are forced apart by a setscrew 21.

The pivot 20 is made up of a circular-shaped extension 30 in half 18 which interfits with a circular-shaped depression 32 in half 17. A plurality of projections, 34, semicircular in cross section, in half 18 extend from the extension 30 outwardly extending upwardly, downwardly, to the right and to the left therefrom. Correspondingly shaped depressions 36 are adapted to receive the projections 34 when the wedge is in the unexpanded position. Screw 21 is threaded into half 17, see FIG. 8, and when it is turned inwardly, its inner end presses against an inner flat surface 19 on half 18 causing it to move about pivot 20 so that the bottom parts of the wedge halves are separated one from another thereby forming a taper with respect to the upper part. The long side 22 of half 18 has a series of serrations 22 which have the same spacing between ridges as those of ridges 13 on vertical member 11. In the unexpanded position, as shown in FIG. 4, all outer surfaces of the wedges are substantially parallel. In the expanded position, as shown in FIG. 6, the opposite flat elongated outer surfaces 17' and 22' form a taper, however the opposite wider surfaces 27 and 28 remain substantially parallel but slightly separated one from another due to inner action of the projections 34 rising out of the depressions 36 when the halves 16 and 18 rotate with respect to one another. Thus expansion occurs in both directions; the first expansion being due to the wedge action against the end walls of the groove 15 and the second expansion being against the sidewalls of the groove 15.

In order to add stability to the horizontal member 10, should it be necessary to put a lot of weight on the shelf, there is provided a triangular metal brace 23 which is located below the shelf 10. An elongated end 24, integral with the metal brace 23 extends between the horizontal and vertical members in a narrow channel 25 cut into horizontal member 10, and terminating in a bent-over hook arrangement 26. By this construction it is obvious that the metal brace 23 is rigidly held in place by the bent-over hook arrangement 26 gripping the top edge of the horizontal member 10 and by the fact that elongated end 24 is compressed between the horizontal and vertical members when they are fastened together.

It may be noted here, after reference to FIG. 1, that the structure of the present invention makes it particularly easy to insert additional horizontal members after others are already locked in place. This advantage results from the fact that the cutout portion 14, in the horizontal member 10, extends from the edge of the member inward for a distance sufficient to encompass the vertical member 11. Some prior art devices have the hole for passage of the vertical set back a distance from the edge of the horizontal member so that additional horizontal members must be threaded on the vertical, from the top, like beads, with the previous shelves being moved down. This procedure is not necessary with the present invention, since additional shelves may be inserted, where desired, without disturbing previous shelves, by merely placing the new shelf against the vertical so that the vertical goes into cutout portion 14.

Turning now to a study of the operation of the invention it can be clearly understood that when it is desirable to assemble the furniture parts, or other components on which the invention is practiced, as with a bookcase, for example, the horizontal member 10 is positioned so that vertical member 11 is encompassed within cutout portion 14 of member 10. It should be noted that in this position channels 12 in the vertical member mate with grooves 15 in the horizontal member. Also at this point, if the metal brace 23 is to be used, it has been placed below the horizontal member, with its elongated end 24 located in narrow channel 25 and the bent-over hook arrangement 26 engaging the top edge of the shelf.

When the shelf has been raised to a convenient height, wedges 16 are placed on either side of the vertical member 11, within the hollow space caused by the mating of channels 12 and grooves 15. The wedges are inserted in their unexpanded configuration (FIG. 4), with the setscrew 21 in its withdrawn position, and with the setscrew below horizontal 10, as in FIG. 1. In its unexpanded configuration the vertical sides of the wedge are substantially parallel. With a slight amount of movement of the wedges, it is easy to cause the serrations 22, on the long vertical side of the wedges, to mate and lock with ridges 13 cut into the bottom of channel 12, in vertical member 11, so as to hold the wedges in place and keep them from falling out.

Now the setscrew 21, shown here as an Allen screw, but any other kind will suffice, is advanced with an Allen wrench so that its inner end presses against wedge half 18. Continued advancement of the screw will force wedge halves 17 and 18 to rotate slightly about pivot point 20 until the wedge assumes a cone-shaped configuration as seen in FIGS. 1 and 6, wherein the vertical sides of the wedge are at an angle to one another. Further, the sidewalls 27 and 28 of the wedge move apart slightly as shown in FIG. 7. Thus, the wedges in their expanded position have securely locked the various components together to form a rigid and stable structure.

From the above description of the structure and operation of the invention, it is obvious that the concept offers numerous improvements over prior art systems. The invention, therefore, provides an adjustable furniture construction wherein the various components may be readily connected and disconnected, in a minimum of time, and wherein the novel gripping means enables convenient adjustment of the relative spacing between components while affording accurate positioning of the structural components and positive connection therebetween.

Obviously many modifications and variations of the present invention are possible in the light of the above teachings. It is therefore to be understood, that within the scope of the appended claims, the invention may be practiced otherwise than as specifically described.

What I claim is:

1. An adjustable wedge for use in adjustable furniture construction comprising a first half and second half having surfaces slidably lapped together to form a rectangular block outer shape, a flat elongated outer surface on said first half and a flat elongated outer surface on said second half, said outer surfaces when the two halves are assembled together in the unexpanded position being substantially parallel to one another, a threaded portion near one end of said first half and extending therethrough from the outer surface thereof, an adjusting screw extending through said threaded portion of said first half and engaging an inner flat surface near one end of said second half, a pivot on said halves transverse to said lapped surfaces and located more than half way above said one end of said halves and spaced from the other ends thereof whereby as said screw is turned inwardly it engages the inner flat surface on said second half causing sliding about said lapped surfaces and relative rotation about said pivot separating said halves at said one end thereof so that the outer surfaces are no longer parallel but form a taper therebetween from top to bottom.

2. An adjustable wedge in accordance with claim 1, wherein a plurality of serrations are located along the outer surface of said second half.

3. An adjustable wedge in accordance with claim 1 wherein said pivot comprises a circular-shaped extension in one half and a circular-shaped depression in the other half adapted to interfit.

4. An adjustable wedge in accordance with claim 2 wherein said pivot comprises a circular-shaped extension in one half and a circular-shaped depression in the other half adapted to interfit.

5. An adjustable wedge in accordance with claim 3 further comprising a plurality of semicircular cross section projections in said one half extending outwardly from said circular-shaped extension and a plurality of semicircular cross section depressions similarly located in said other half whereby in the unexpanded position said projections and depressions interfit and when said screw is turned and said halves rotate to the expanded position said projections rise from said depressions and cause outward movement in later directions between said halves.